Aug. 26, 1969  H. KOCH ET AL  3,462,796
APPARATUS FOR GRANULATING TOUGH PLASTIC MATERIAL COMPOUNDS
Filed Jan. 13, 1967  2 Sheets-Sheet 1

INVENTORS:
HEINZ KOCH &
HARALD HUGO PAUL by Stephen H. Frishauf
Atty

United States Patent Office 3,462,796
Patented Aug. 26, 1969

3,462,796
APPARATUS FOR GRANULATING TOUGH
PLASTIC MATERIAL COMPOUNDS
Heinz Koch, Ludwigsburg, and Harald Hugo Paul, Korn-westheim, Germany, assignors to Werner & Pfleiderer, Stuttgart-Feuerbach, Baden-Wurttemberg, Germany, a corporation of Germany
Filed Jan. 13, 1967, Ser. No. 609,164
Claims priority, application Germany, Jan. 22, 1966,
W 40,783
Int. Cl. B02c 18/06
U.S. Cl. 18—9                                    7 Claims

ABSTRACT OF THE DISCLOSURE

A cutting device is arranged relative to working rollers for ease of cleaning and disassembly of the machine, by providing a fixed cutter bar and a revolving cutter, together as a unit, and arranging the unit to be readily displaceable relative to the roller, thus maintaining a pre-set cutting distance.

Prior application

Priority, Germany, W40783, Jan. 22, 1966.

The invention concerns an apparatus for granulating tough plastics material compound between two collaborating working rollers, each of the working rollers having associated therewith a cutting device separating the worked material into sections of a definite length and comprising at least a revolving cutting blade and a fixed cutter bar.

In apparatus of the kind referred to, the working rollers are provided with individual grooves arranged at predetermined distances from one another and the depth and width of the grooves corresponding to the required extrusion shape or size of granulate. During the operation of suitable machines, it is unevitable that pieces of granulate are deposited in the interior of the machine. As a result, the machine has to be carefully cleaned before changing the mixture. Such cleaning, however, is cumbersome and time-wasting, because the entire cutting device has to be removed and subsequently be reset. If the machine, when changing the mixture, is not thoroughly cleaned, then adverse effects set in with regard to a constant quality and/or colour of the material.

The object of the invention is to provide a granulating device in which the said disadvantages are eliminated in a simple and reliable manner, and at the same time that the cutting device remains at an accurate predetermined distance relative to the working roller without special and laborious adjustment operations thus ensuring maximum operating results and ultilization of the machine.

According to the present invention in an apparatus for granulating tough plastic compounds between two co-operating working rollers, each of the working rollers have associated therewith a cutting device comprising at least one revolving cutter and a fixed cutter bar for severing the formed compound into sections of definite length, the cutting device being formed as a unit which is displaceable relative to one working roller, the distance of the unit from the working roller being adjustable and fixable relative to the working roller. This permits the machine to be cleaned simply and rapidly in a proposed mixture change more especially the machine space, without the danger of the operational state adjusted of the cutting device being inadvertently changed relative to the working roller. This apparatus simultaneously permits the adaptation of the distance of the cutting device or the fixed cutter bar of the cutting device to the given workability of the treated mixture.

In a known cutting device for tough plastics materials, an adjustable arrangement of the fixed cutter bar relative to the rotating cutters is provided to ensure a constant cutting action. This embodiment, however, only permits the adjustment of a constant distance between cutter bars and the cutters over the overall cutter length, but not a movement of the whole cutting device.

The arrangement described permits the position of the whole cutting device as a unit to be adapted relative to the associated working roller and ensures a given operating value even allowing for the cleaning of the machine. Preferably the cutting device should be mounted pivotally on an axle located parallel to the axle of the associated working roller, so as to ensure that the cutter bar, and hence the cutting device, maintains a constant distance over the whole length of the momentary working roller, whereby constant operating conditions are ensured. In an apparatus having holders mounted in fixed bearings in the machine, such as, end plates to receive the working rollers, it is advisable, in accordance with a further proposal for the cutting devices to be mounted pivotally in bearings arranged coaxially with the bearings of tthe holders. The advantage of this arrangement is that each cutting device is adapted to be pivotal, both on its own and simultaneously with the holder for the associated working roller. If, for example, the whole apparatus is to be cleaned and the two holders to receive the working rollers are swung outwardly, the cutting devices may be swung out together with the holders. If, on the other hand, it is merely intended to clean the interior of the machine, or alter the distance of the fixed cutter bar relative to the associated working roller, then it suffices for the cutting devices to be swung about on their own. This arrangement is particularly advantageous for any conceivable operational case, since it may be adjusted quickly, and without special device, even by unskilled operators.

In the case of particularly heavy apparatus, the cutting device are preferably coupled with a pivoting device which may be adapted in the form of a power storage or a device actuated mechanically, hydraulically or pneumatically. To ensure a set distance of the cutting device relative to the associated working roller, it is advisable to provide an adjustable stop which, if necessary, may be provided with calibrations for certain mixtures or other details important to the operating of the device.

It is advisable to locate the operating position of the cutting device by special securing members, the securing members may be adjusting or securing screws. It is also possible with the scope of the invention to form the stops for defining the operational end position of the cutting devices simultaneously as securing members. Similarly it is also possible to provide limit switches adjustable to certain values which may act both as stops and as securing members.

The invention will be described further, by way of example, by reference to the accompanying drawings, in which.

Figure 1:
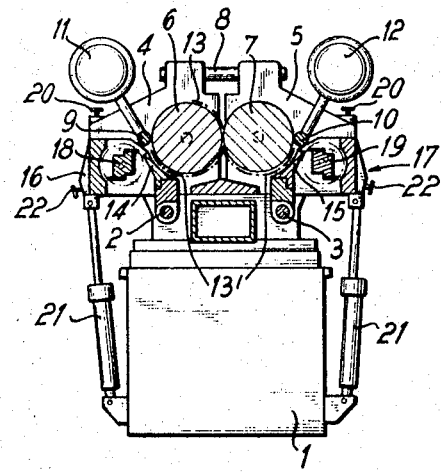
FIG. 1 is a simplified view, partly in section of an apparatus for granulating tough plastic compounds.

In the upper part of a fixed machine frame 1 bearings 2 and 3 are provided to receive pivotally individual holders 4 and 5, in which the working rollers 6 and 7 are rotatably mounted. The working rollers 6 and 7 are driven by means not shown in detail in the drawing. Their mutual distance is determined by means of one or more stays 8 connecting both holders 4, 5.

Within the holders 4 and 5, ejector rollers 9 and 10, driven by prime movers 11 and 12 are pivotally mounted which cooperate with the working rollers 6 and 7. The working rollers 6 and 7 have grooves formed therein arranged at a predetermined distance from one another in detail in the drawing, in which grooves suitable profiled ejecting rollers 9 and 10 engage.

The tough plastic mass 13 indicated in chain-dotted lines in the drawing is passed between the working rollers 6 and 7. Then, in the form of individual strands 13' located in the grooves of the working rollers 6 and 7, they are transferred to the ejector rollers 9 and 10 which forward them, via a fixed cutter bar 14 or 15 to a cutting device 16 or 17 associated with each working roller 6 or 7. If necessary, the compound may also be supplied as a pre-shaped pelt to the working rollers 6 and 7.

The cutting devices 16 and 17 comprise the affixed cutter bars 14 and 15 and a displaceable cutter 18 and 19 each having one or more cutting edges spread regularly or irregularly over the circumference. The individual strands 13' located in the grooves of the working rollers 6 and 7 are thus forwarded by the ejecting rollers 9 and 10 to the cutting devices 16 and 17 via the fixed cutter bars 14 and 15 to the cutters 18 and 19 and, dependent upon the selected speed of the cutters or the working rollers, brought into the form of granulate sections.

Figure 3:
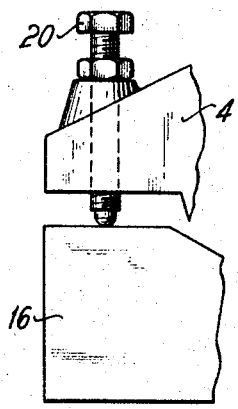
FIG. 3 is an enlarged view of a device to limit the operating position of the cutting device.

The operating position of the cutting devices 16 and 17 within the holders 4 and 5 is fixed by the stops 20 and, formed, for example as screws, arranged in the holders. In FIG. 3 of the drawings, screw 20 is shown, against which the upper edge of the cutting devices 16 or 17 strikes.

Figure 2:
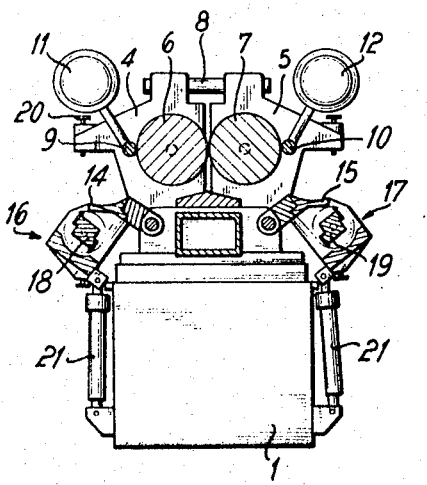
FIG. 2 is a view of the apparatus, in accordance with FIG. 1, with cutting devices in the swung out position.

If the cutting devices 16 and 17 are to swung about relative to the holders 4 and 5 then, as evident from FIG. 2 of the drawing, a pivoting device arranged on the machine frame 1, possibly in the form of a hydraulic piston 21 is actuated, so that that the cutting devices 16 and 17 are moved outwardly about their bearings coaxially with the bearings 2 and 3 for the holders 4 and 5.

Thus, when changing a mixture, the cutting devices 16, 17 are swung outwards and the interior of the apparatus is to be cleaned or the stops 20 are to be altered respectively, then the pivoting device 21 is actuated so that the cutting devices 16 and 17 are caused to assume their positions as shown in FIG. 2. This permits the stops 20 to be adjusted to a new predetermined value and simultaneously the interior of the apparatus to be cleaned. The cutting devices 16 and 17 may then be swung back into their operating position and slackened therein by means of the securing screws 22 indicated in FIG. 1 of the drawings before swinging about the cutting devices 16 and 17.

If it is merely intended to alter the distance of the cutting devices 16 and 17, i.e. to vary the distance of the cutter bars 14 and 15 relative to the associated working rollers 6 and 7, then it suffices merely to set the adjusting stops 20 to the new value and the cutting devices to be adjusted.

Figure 4:
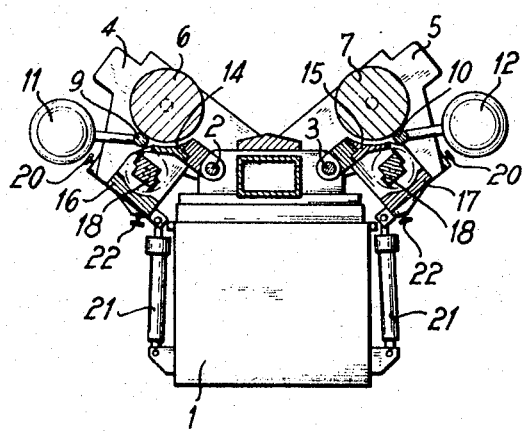
FIG. 4 is a view of the apparatus, in accordance with FIG. 1, with working rollers and cutting devices swung out.

If, however, the whole apparatus is to be overhauled and cleaned, then the cutting devices 16 and 17 together with the associated holders 4 and 5 of the working rollers 6 and 7 may be swung about, as shown in FIG. 4 of the drawings. The securing members 22 in this case are not slackened first but only the stays 8 securing the two holders 4 and 5. The holders 4 and 5 together with the cutting devices 16 and 17 may also be swung about by means of the pivoting device 21.

With regard to the configuration of the pivoting device 21 and the cutting device itself, manifold changes and modifications are permitted within the scope of the invention. This also applies to the mounting of the cutting devices 16 and 17 and the development of the cutters or their mounting. Also, with regard to the configuration of the stop for limiting the operating position of the cutting devices 16 and 17 and their securing members 22, manifold modifications are possible. Thus, it is possible for the stops 20 for the cutting devices 16 and 17 to be formed simultaneously as securing members. Also with regard to marking certain operating positions or certain positions for the stops 20, and hence the cutting devices 16 and 17, manifold modifications are possible.

We claim:

1. Apparatus for granulating plastic material or the like, comprising:
    a frame;
    a pair of working rollers rotatably mounted to said frame;
    a pair of cutting units, each comprising revolving cutter and a fixed cutter bar, each cutting unit associated with a respective one of said working rollers for severing said plastic material into sections of predetermined length; and
    means displaceably mounting each of said cutting units relative to its respective working roller to enable access to internal portions of said granulating apparatus when a cutting unit is displaced, the distance of each cutting unit from its respective working roller being adjustable and fixable.

2. Apparatus according to claim 1 wherein said displaceable mounting means includes means pivotally mounting each said cutting unit about an axis located in parallel with the axis of its associated working roller.

3. Apparatus according to claim 1 wherein each of said working rollers is mounted to said frame by means of a holder member pivotally mounted to said frame, and wherein each of said cutting unit mounting means includes means pivotally mounting a cutting unit about substantially the same pivot point about which the holder member for its respective working roller is mounted.

4. Apparatus according to claim 3 wherein said holder member is pivotally mounted in a bearing fixed to said frame and wherein each said cutting unit mounting means is pivotally mounted in a bearing arranged coaxially to the bearings of said holder members.

5. Apparatus according to claim 1 comprising an adjustable stop means associated with each cutting unit and its associated working roller, for adjustably and fixably setting the distance between each cutting unit and its respective working roller.

6. Apparatus according to claim 1 comprising securing members associated with each of said cutting units for fixing the position of each of said cutting units relative to its respective working roller.

7. Apparatus according to claim 3 comprising means fixing the position of each said cutting unit with respect to its associated holder member.

References Cited

UNITED STATES PATENTS 3,140,511    7/1964    Senfert et al. _____ 18—9 XR
3,339,233    9/1967    Woitzel _____ 18—9

WILLIAM J. STEPHENSON, Primary Examiner

U.S. Cl. X.R.

18—1